(12) United States Patent
Stickelberger et al.

(10) Patent No.: US 10,202,995 B2
(45) Date of Patent: Feb. 12, 2019

(54) SELF-LOCKING EDGE CLIP FASTENER

(71) Applicant: A. Raymond Et Cie, Grenoble (FR)

(72) Inventors: Jan Peter Stickelberger, Lorrach (DE); Stefan Schulz, Lorrach (DE); Melanie Anna, Grenzach (DE); Richard Geist, Southfield, MI (US); Jimmy Voniez, Huntington Woods, MI (US); Michael Danby, Stoney Creek (CA)

(73) Assignee: A. Raymond et Cie, Grenoble (FR)

( * ) Notice: Subject to any disclaimer, the term of this patent is extended or adjusted under 35 U.S.C. 154(b) by 359 days.

(21) Appl. No.: 14/924,635

(22) Filed: Oct. 27, 2015

(65) Prior Publication Data
US 2017/0114809 A1 Apr. 27, 2017

(51) Int. Cl.
*F16B 5/06* (2006.01)
*F16B 2/22* (2006.01)

(52) U.S. Cl.
CPC .............. *F16B 5/0635* (2013.01); *F16B 2/22* (2013.01); *Y10T 24/4441* (2015.01)

(58) Field of Classification Search
CPC .. Y10T 24/4441; Y10T 24/023; F16B 5/0635; F16B 2/22

USPC .......... 24/517, 499, 527, 545–547; 411/172–175
See application file for complete search history.

(56) References Cited

U.S. PATENT DOCUMENTS

| 4,684,305 A * | 8/1987 | Dubost | B42F 9/00 411/174 |
| 6,343,409 B1 * | 2/2002 | McAllister | B65F 1/06 24/536 |

\* cited by examiner

*Primary Examiner* — Abigail E Troy
(74) *Attorney, Agent, or Firm* — LeClairRyan

(57) ABSTRACT

A self-locking push-on clip fastener for securing two components together is disclosed. The clip fastener includes a u-shaped clip body that includes upper and lower legs and a curved end that connects the legs. The clip body has an open end into which the component to be attached is inserted. The legs are movable between an initial, spaced apart arrangement in which the component may be inserted into the clip body, to a final component-engaging position in which the component is captured between the legs. A slidably movable u-shaped trigger is attached to the clip body. A trigger-guiding channel is formed on the inner wall of one or both of the legs of the clip body. The trigger is slidably movable in the channel. An interlock system comprising first and second windows is formed in one of the legs of the clip body and a flange extending from the trigger.

30 Claims, 18 Drawing Sheets

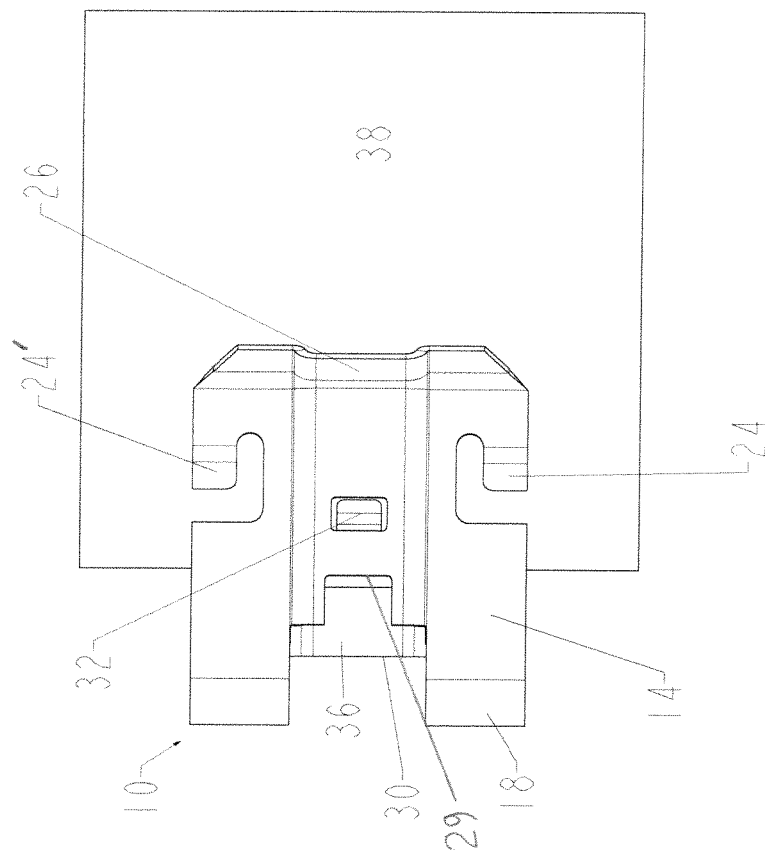
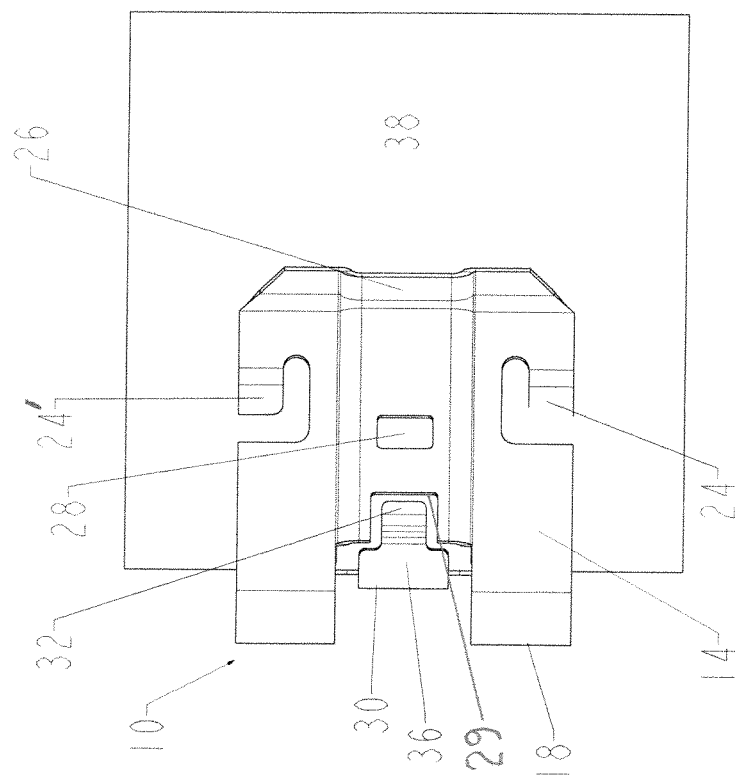

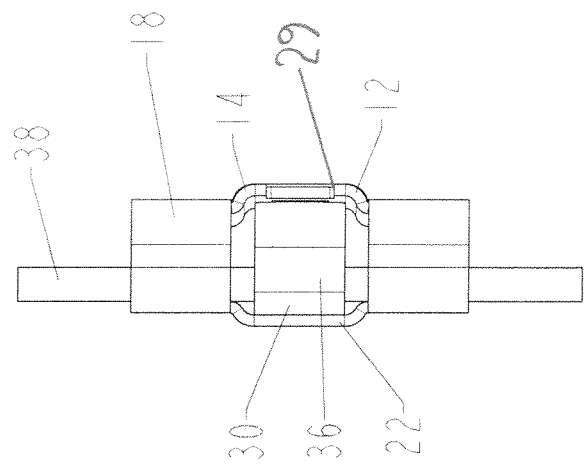
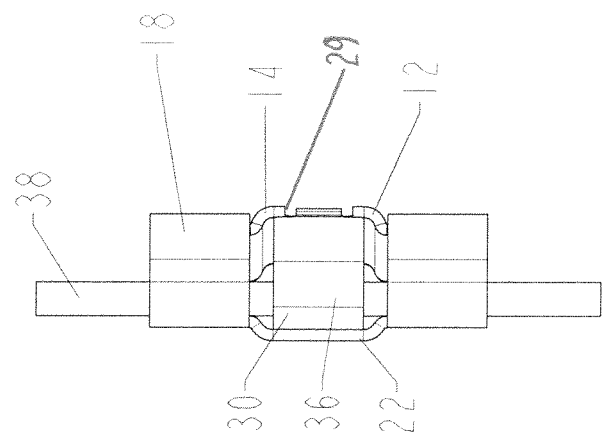

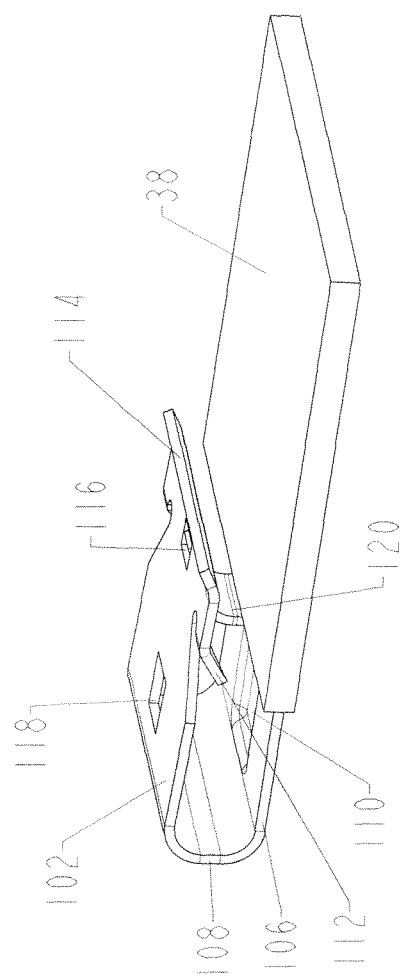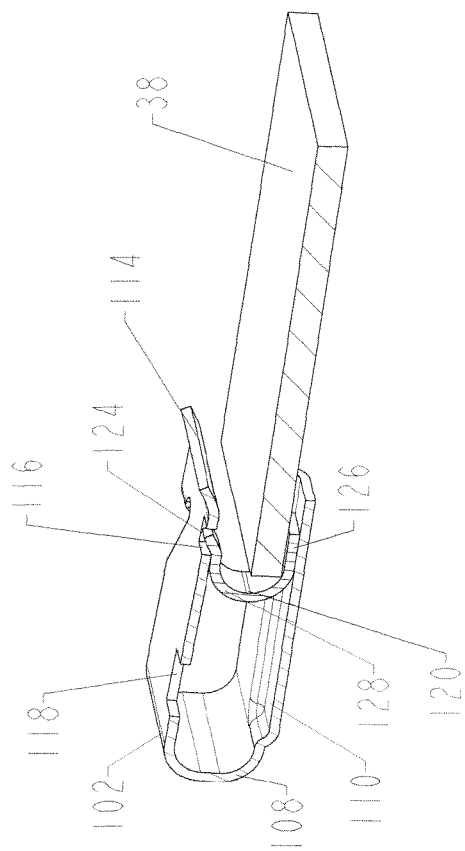

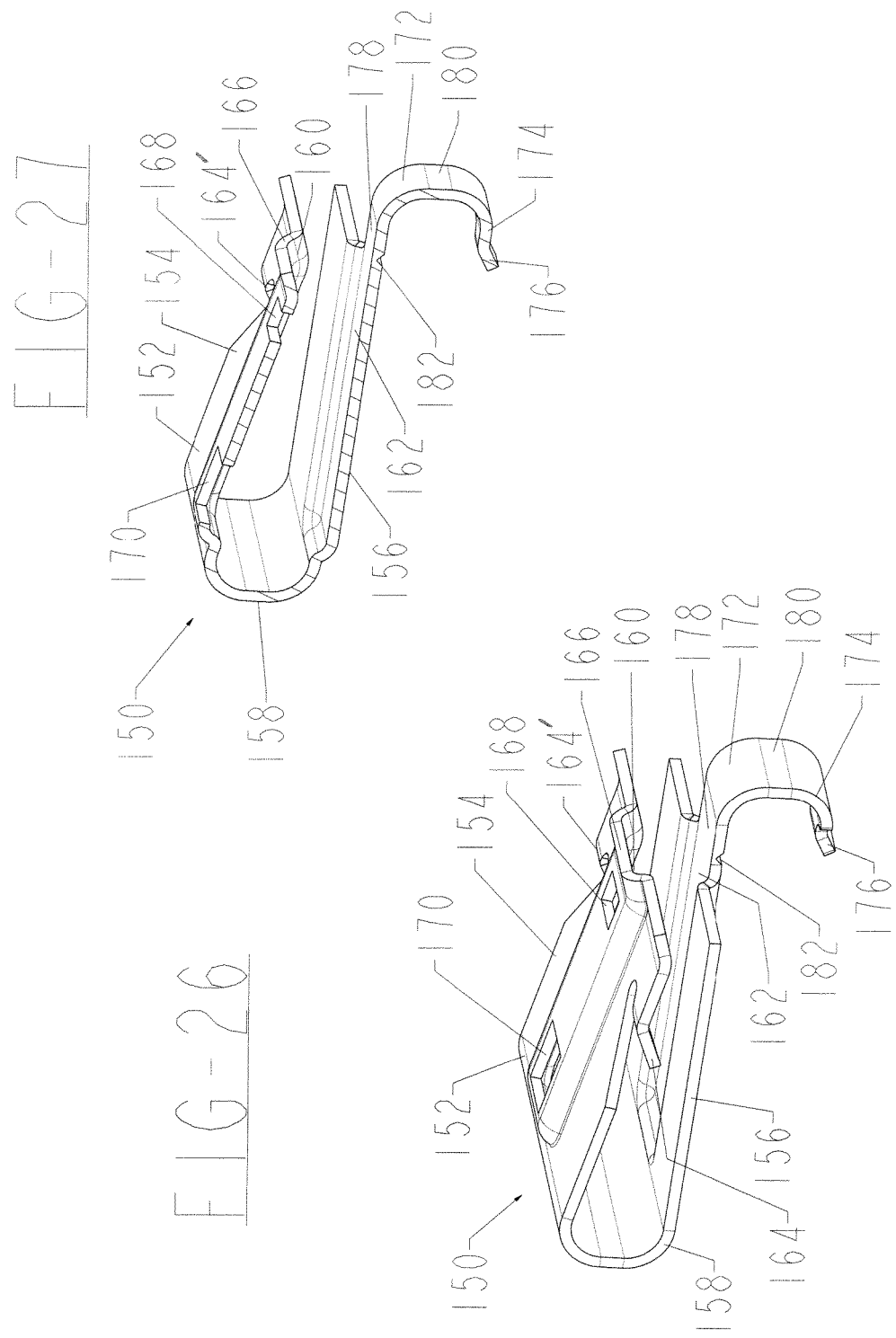

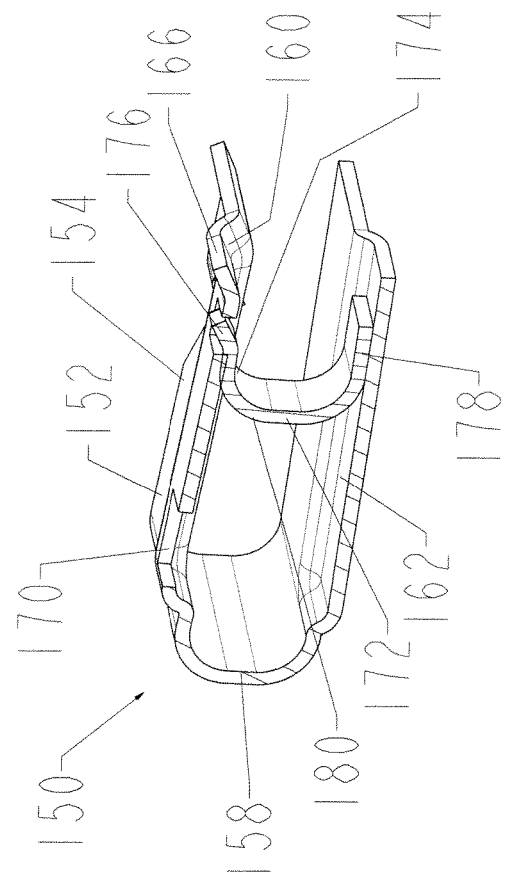

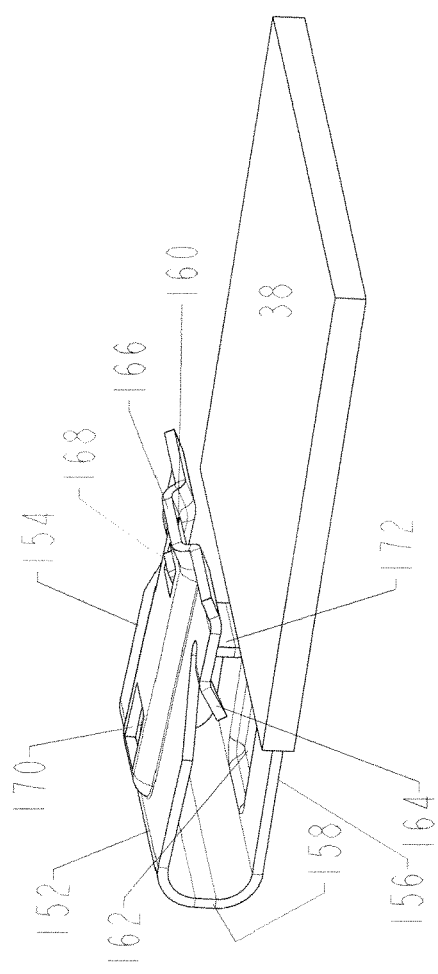
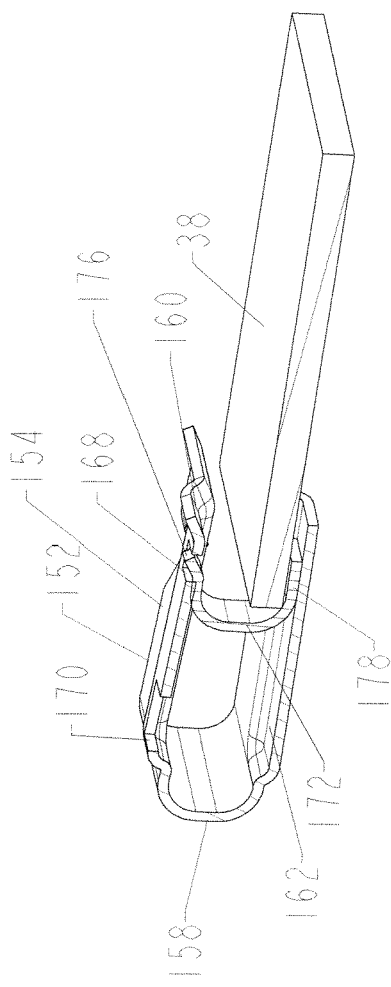

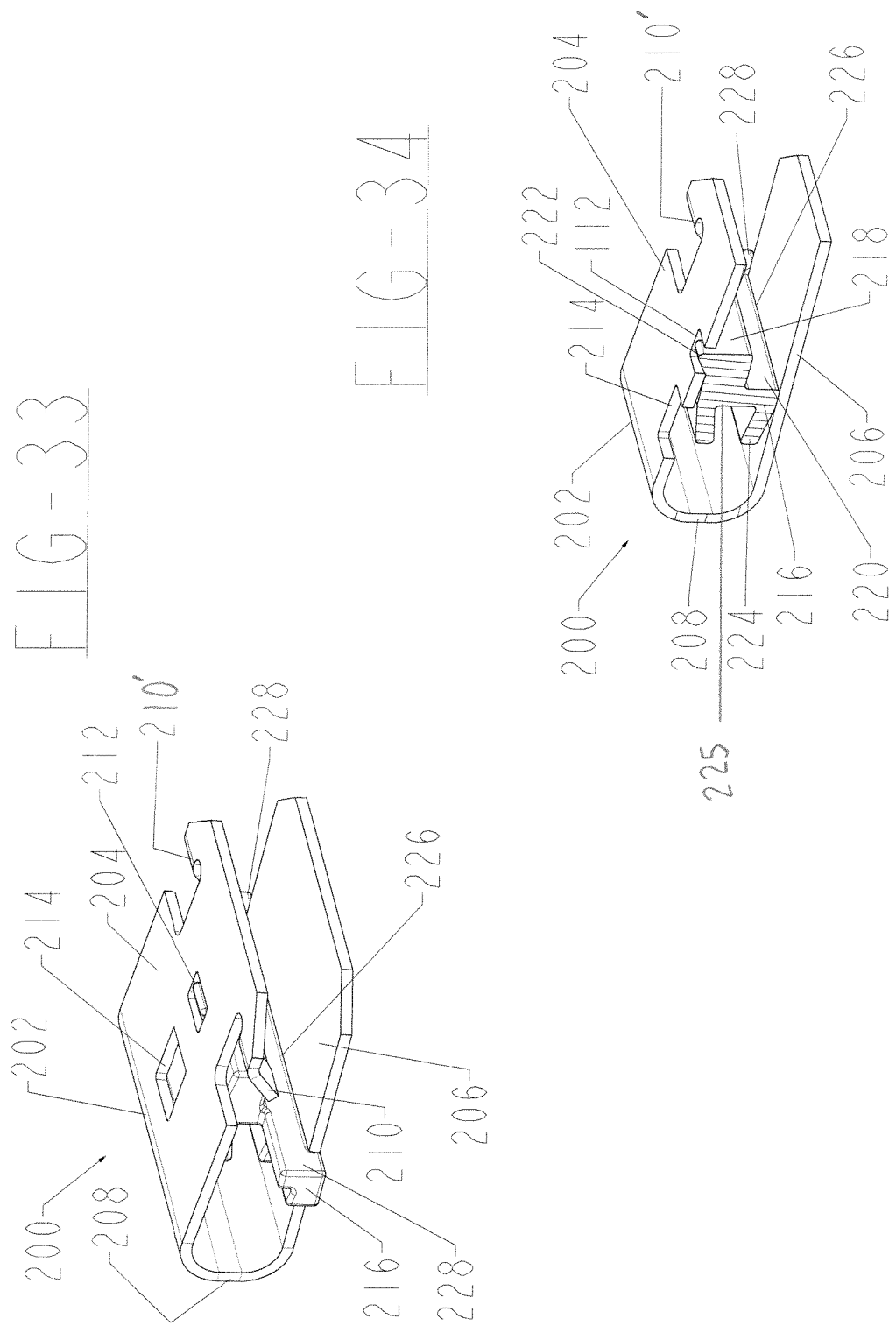

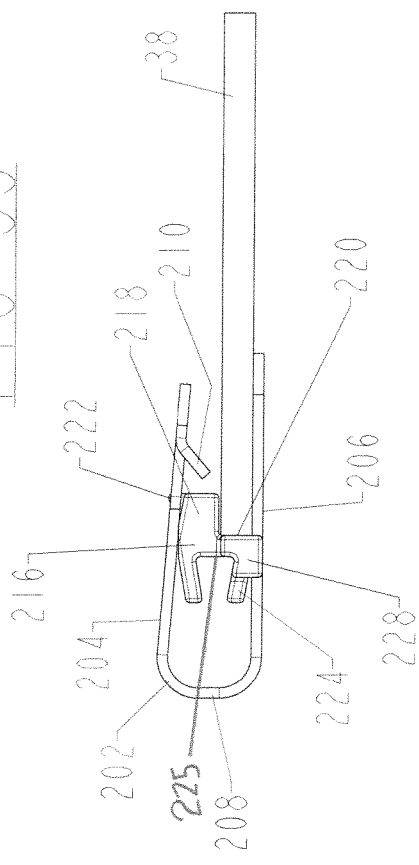
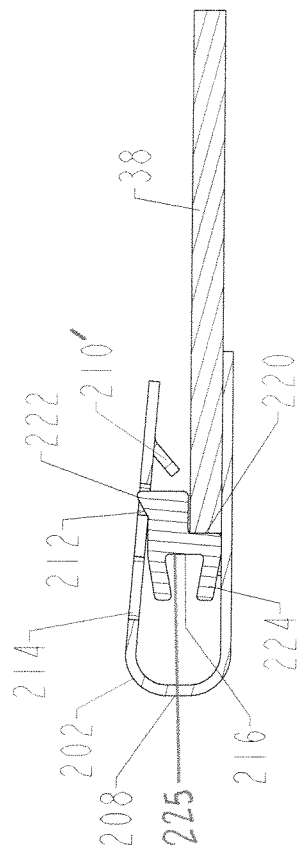
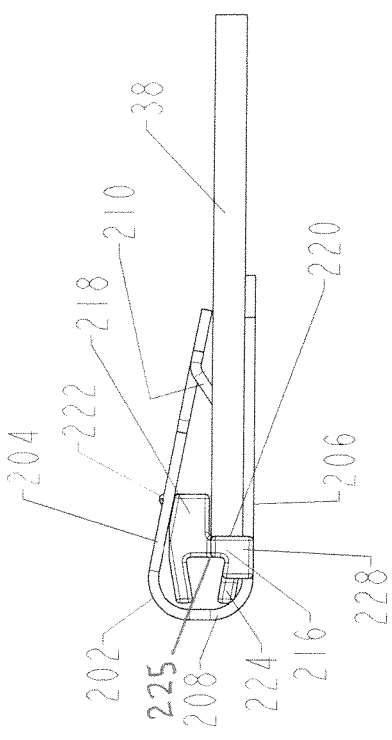
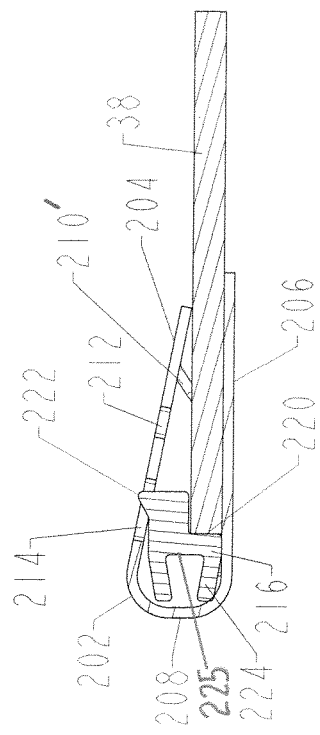

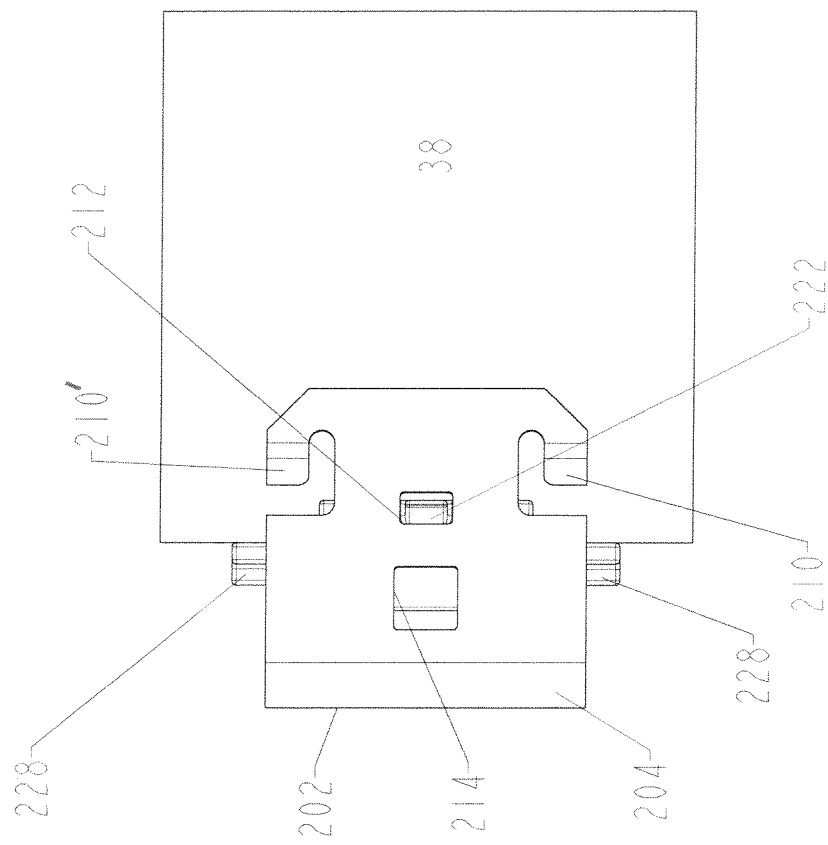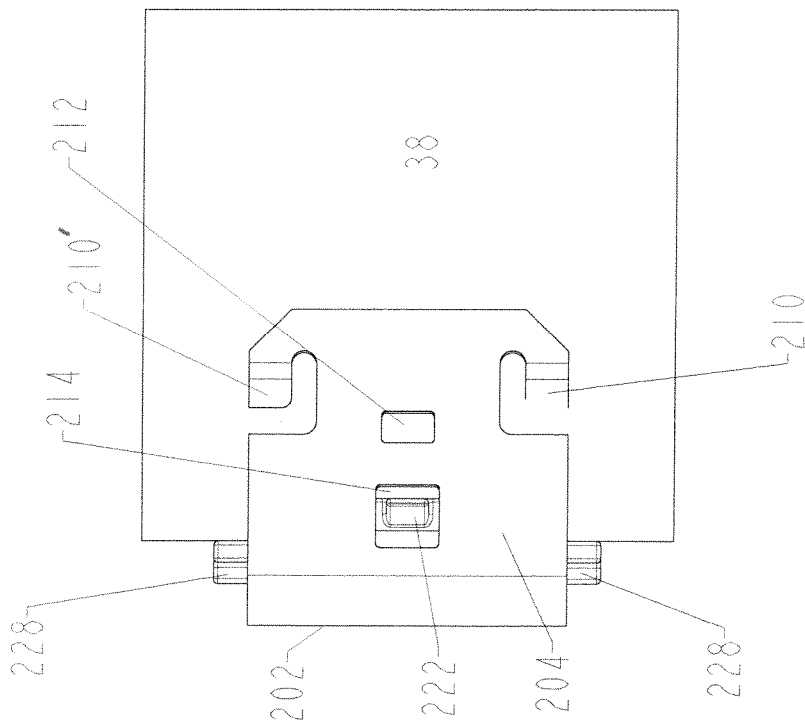

SELF-LOCKING EDGE CLIP FASTENER

TECHNICAL FIELD

The disclosed inventive concept relates generally to fasteners for use in coupling two components together. More particularly, the disclosed inventive concept relates to edge clip fasteners that are self-locking. A trigger is movably displaceable from its initial, pre-locking position, to a locking position. In the locking position, the position of the trigger is locked while the component is fixed to the edge clip fastener. Also in the locking position, the trigger is entirely disposed within the body of the edge clip fastener.

BACKGROUND OF THE INVENTION

Clip fasteners replace traditional screw fixings in many applications and have may uses in a wide variety of industries. Broadly speaking, clip fasteners are utilized for fastening two or more components together. Challenges faced by industries include different types of tools needed for assembly and different materials to be fastened together. Other challenges include fastening locations, which may offer only limited access for both assembly during manufacture and removal or adjustment during maintenance. Each of these challenges has the potential for increasing assembly cost to manufacturers because of added tooling as well as extra assembly time.

Clip fasteners commonly find utility in the energy and automotive sectors. In the energy sector, clip fasteners are commonly used to hold solar panels to underlying framework. Also in the energy sector, clip fasteners are used to fasten and ground photovoltaic modules and in the fastening of electric cables.

In the automotive sector, clip fasteners have many uses, including in air bag assembly, window construction, instrument panels and interior and exterior trim attachment. These are some examples of the many uses known for clip fasteners.

Modern demands on the design and construction of clip fasteners mean that new clip fastener solutions need to contribute to ease of assembly as used in production (particularly in view of increasing automation) and provide excellent attachment strength, while maintaining high reliability and low production costs. Compliance with the need for standardization and the requirements of the automotive industry has proved challenging to current clip fastener designs.

Accordingly, and as is the case in many industries, known approaches to clip fasteners for use in attaching components together are undesirable and impractical. An improved arrangement for attaching two components together remains wanting.

SUMMARY OF THE INVENTION

The disclosed inventive concept overcomes the problems associated with edge clips by providing a simple and cost-effective response to the demands of the marketplace. Particularly, the self-locking (or self-latching or self-retaining) edge clip for attachment of a component according to the disclosed inventive concept includes a u-shaped clip body adaptable between a first position in which the component may be freely inserted to a second position in which the component is captured by the clip. The clip body includes upper and lower legs and a curved end that connects the legs. The clip body has an open end into which the component to be attached is inserted. The legs are movable between an initial, spaced apart arrangement in which the component may be inserted into the clip body, to a final component-engaging position in which the component is captured between the legs. The edge clip of the disclosed inventive concept may have a broad variety of applications that include, but are not limited to, attachment of components in an automobile.

A slidably movable u-shaped trigger is attached to the clip body. According to the preferred embodiments, the u-shaped trigger is provided substantially if not entirely within the clip body. A trigger-guiding channel is formed on the inner wall of one or both of the legs of the clip body. The trigger is slidably movable in the channel. An interlock system is disclosed comprising a first window and a second window formed in one of the legs of the clip body and a flange extending from the trigger. The first window is provided so that the trigger flange may be locked in its initial position in which the legs are held in their spaced apart positions by the trigger. The second window is provided so that the trigger flange may be locked in its final position in which the legs apply locking tension to the component. The second window may be formed in the curved end of the clip body.

Variations of the self-locking edge clip according to the disclosed inventive concept include a frangible bridge that attaches the trigger to the clip body. The frangible bridge may be broken for placement of the trigger within the clip body prior to attachment of the component. In another variation, the trigger includes an underside that slides along the inner wall of one of the legs, guided on both sides by a pair of spaced-apart lateral arms that extend over the opposed edges of the leg. In yet another variation of the disclosed inventive concept, the trigger may be ejected out of the clip body upon insertion of the component.

Upon insertion of the component into the clip body, the trigger is displaced from its initial position in which the trigger holds the legs apart to its final position when the trigger is pushed clip-inward, resulting in the legs applying a capturing tension to the component. One or more barbs may be provided that extend from the inside wall of one of the legs to help frictionally engage the component, thereby further assuring that, once locked into the edge, clip, the component is not easily released. Provision of the barbs in their various embodiments minimize or eliminate entirely the risk of scratching the painted surface of the component being attached. By avoiding the scratching of the painted surface, the risk of corrosion is also minimized or entirely eliminated.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 5 is a top plan view of the edge clip shown in FIG. 1 again illustrating a component in the clip body awaiting insertion;

FIG. 6 is an end view of the edge clip and component combination of FIG. 5 in which the component is awaiting insertion;

FIG. 9 is a top plan view of the edge clip according to the first embodiment of the disclosed inventive concept in its final position with the component fully inserted;

FIG. 10 is an end view of the edge clip and component shown in FIG. 9;

FIG. 22 is a perspective view of the edge clip shown in FIG. 21 illustrating a component in position in the clip body awaiting insertion in which the edge clip and the component are shown in cross-section;

FIG. 23 is a perspective view of the edge clip shown in FIG. 21 illustrating a component in position in the clip body awaiting insertion;

FIG. 26 is a perspective view of an edge clip according to a fourth embodiment of the disclosed inventive concept shown in its initial position;

FIG. 27 is a view similar to that of FIG. 26, but illustrating the clip edge in cross-section;

FIG. 28 is a view similar to that of FIG. 27, but illustrating the trigger having been broken off of the lower leg of the clip body and inserted into the edge clip body to receive the component;

FIG. 29 is a perspective view of the edge clip according to the fourth embodiment of the disclosed inventive concept shown in its initial position with a component in position awaiting insertion;

FIG. 30 is the same view as FIG. 29 but shown in cross-section;

FIG. 33 is a perspective view of an edge clip according to a fifth embodiment of the disclosed inventive concept shown in its initial position;

FIG. 34 is a view similar to that of FIG. 33, but illustrating the clip edge in cross-section;

FIG. 35 is a side view of the edge clip in its initial position as shown in FIG. 33 and further illustrating a component in position in the clip body awaiting insertion;

FIG. 36 is the same view as FIG. 35 but shown in cross-section;

FIG. 37 is a top plan view of the edge clip shown in FIG. 33 again illustrating a component in the clip body awaiting insertion;

FIG. 38 is a side view of the edge clip in its final position in which the trigger has been fully inserted and the component is in its captured position;

FIG. 39 is the same view as FIG. 38 but shown in cross-section; and

FIG. 40 is a plan view of the edge clip in its final position in which the trigger has been fully inserted and the component is in its captured position.

DETAILED DESCRIPTION OF THE PREFERRED EMBODIMENT

Figure 2:
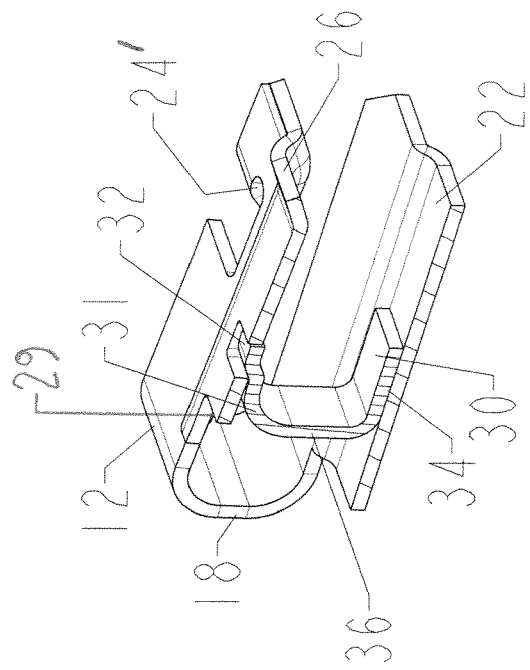
FIG. 2 is a view similar to that of FIG. 1, but illustrating the clip edge in cross-section.
Figure 1:
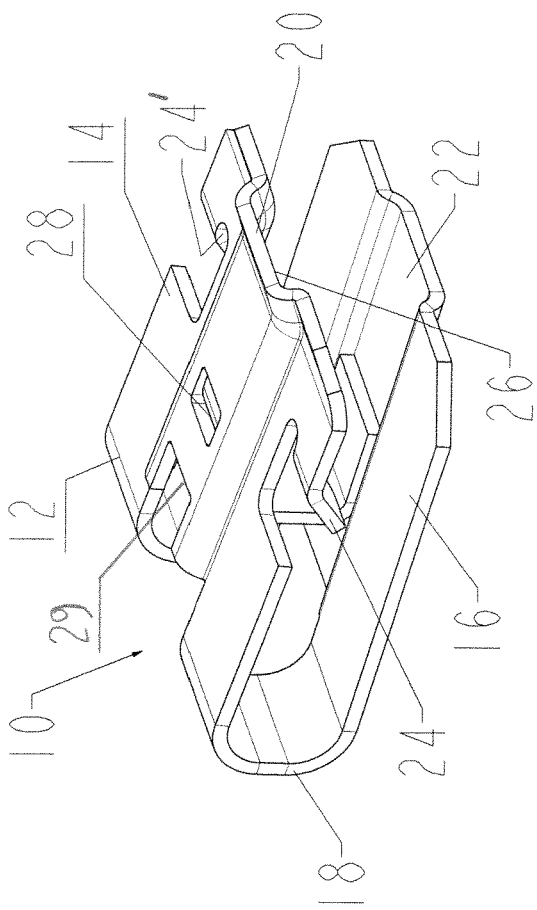
FIG. 1 is a perspective view of an edge clip according to a first embodiment of the disclosed inventive concept shown in its initial position.
Figure 3:
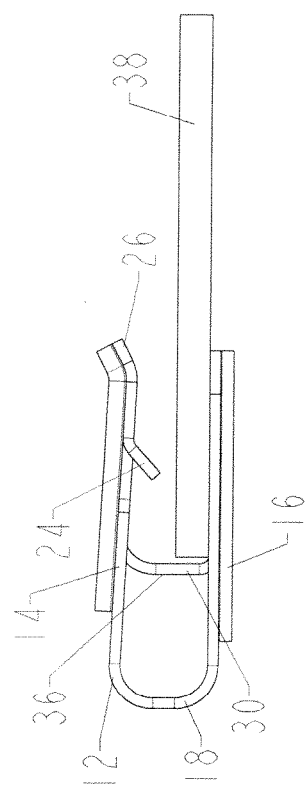
FIG. 3 is a side view of the edge clip shown in FIG. 1 illustrating a component in position in the clip body awaiting insertion.
Figure 4:
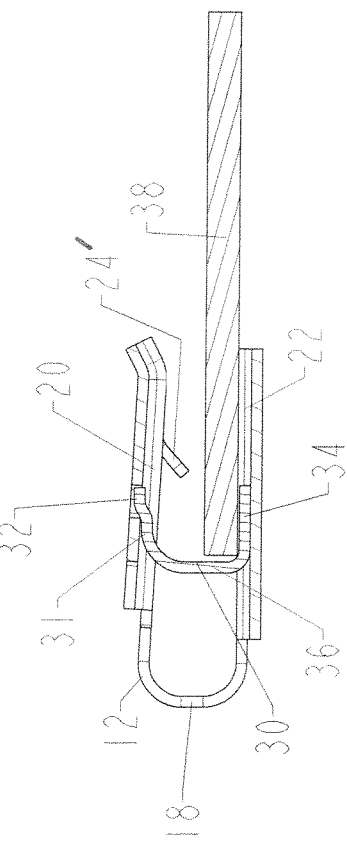
FIG. 4 is the same view as FIG. 3 but showing the edge clip and component in cross-section.
Figure 7:
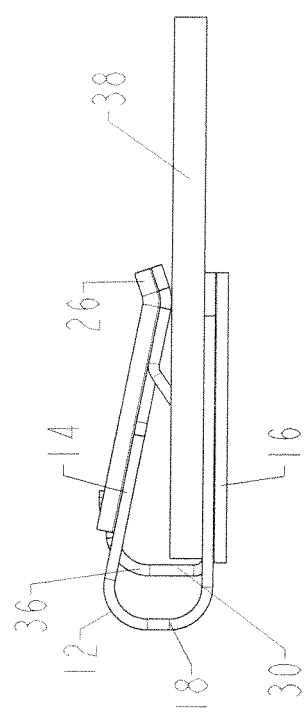
FIG. 7 is a side view of the edge clip according to the first embodiment of the disclosed inventive concept in its final position with the component fully inserted.
Figure 8:
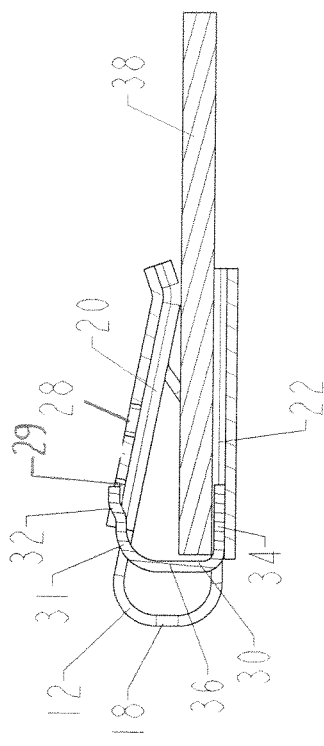
FIG. 8 is the same view as FIG. 7 but showing the edge clip in its final position together with the component in cross-section.
Figure 12:
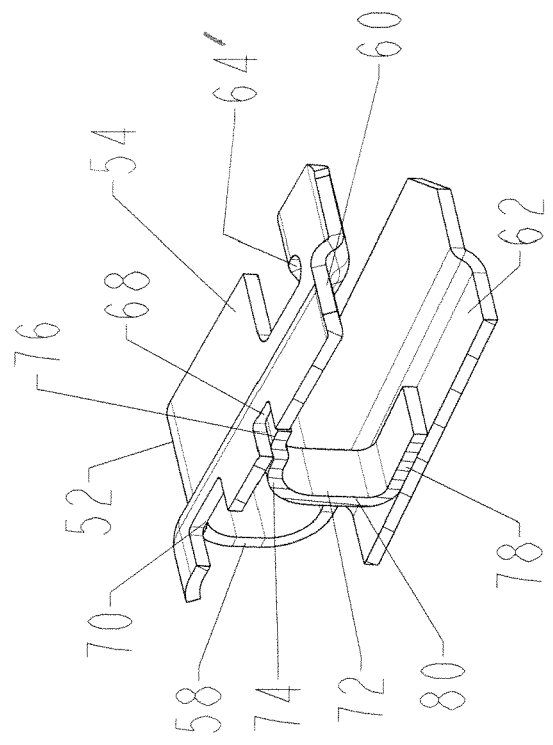
FIG. 12 is a view similar to that of FIG. 11, but illustrating the clip edge in cross-section.
Figure 11:
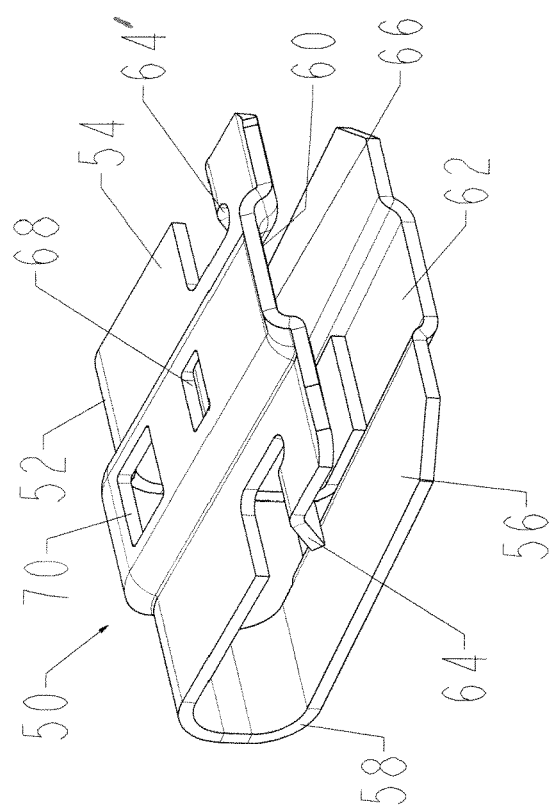
FIG. 11 is a perspective view of an edge clip according to a second embodiment of the disclosed inventive concept shown in its initial position.
Figure 13:
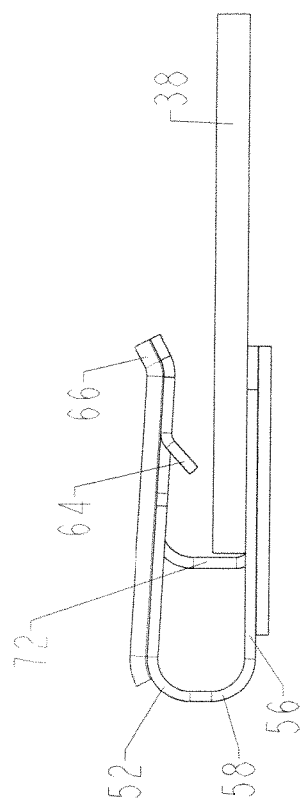
FIG. 13 is a side view of the edge clip shown in FIG. 11 illustrating a component in position in the clip body awaiting insertion.
Figure 14:
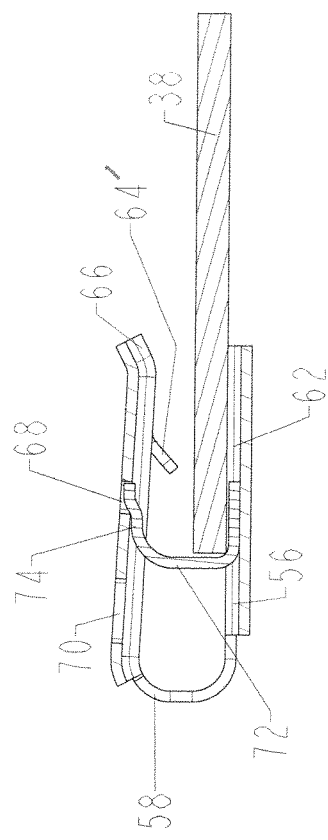
FIG. 14 is the same view as FIG. 13 but showing the edge clip and component in cross-section.
Figure 17:
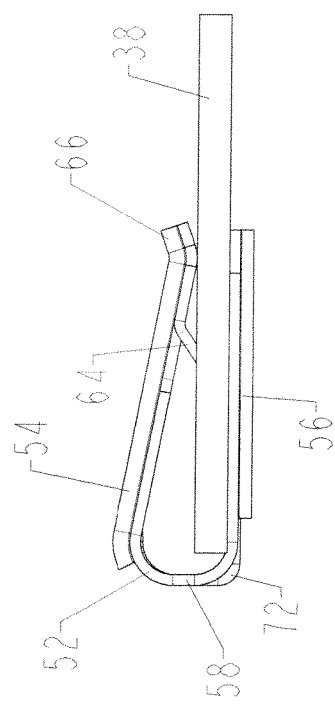
FIG. 17 is a side view of the edge clip according to the second embodiment of the disclosed invention in its final position with the component fully inserted.
Figure 18:
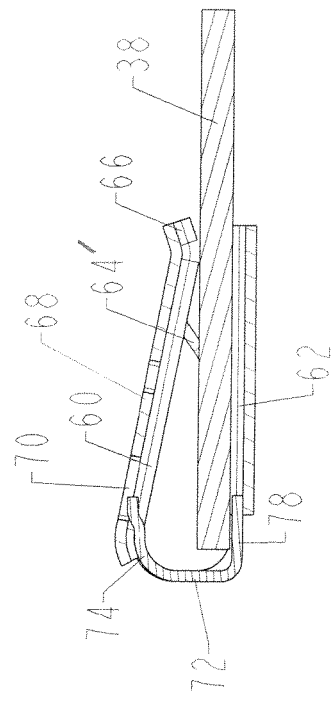
FIG. 18 is the same view as FIG. 17 but showing the edge clip in its final position together with the component in cross-section.
Figure 15:
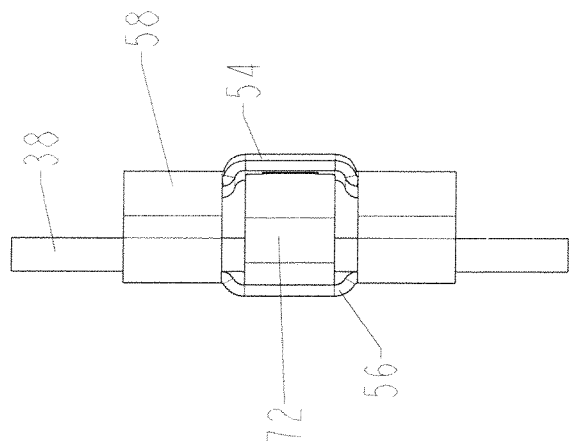
FIG. 15 is an end view of the edge clip and component combination of FIG. 14 in which the component is awaiting insertion.
Figure 20:
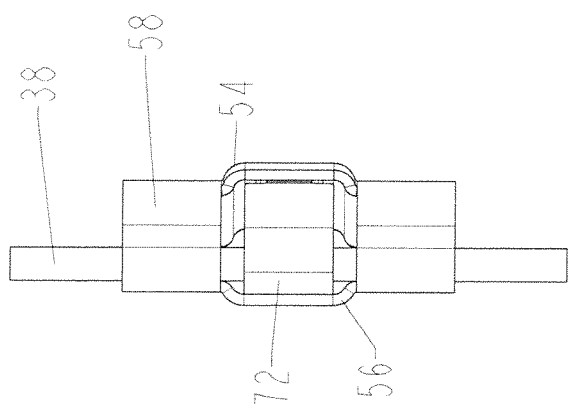
FIG. 20 is an end view of the edge clip and component shown in FIG. 19.
Figure 16:
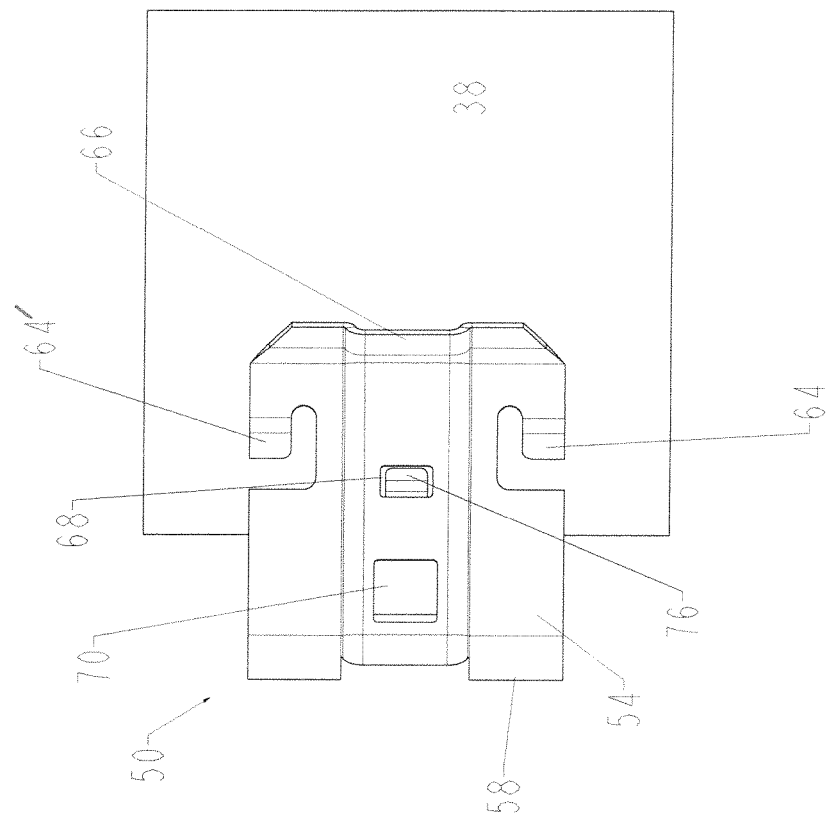
FIG. 16 is a top plan view of the edge clip shown in FIG. 11 again illustrating a component in the clip body awaiting insertion.
Figure 19:
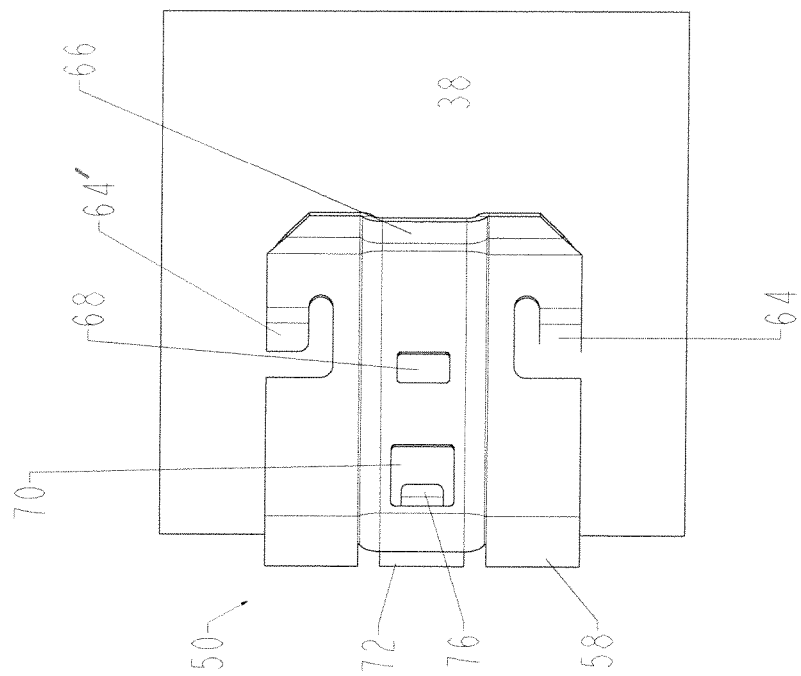
FIG. 19 is a top plan view of the edge clip according to the second embodiment of the disclosed inventive concept in its final position with the component fully inserted.

As those of ordinary skill in the art will understand, various features of the embodiments illustrated and described with reference to any one of the figures may be combined with features illustrated in one or more other figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations.

Various embodiments of the disclosed inventive concept are illustrated in the figures and are discussed in conjunction therewith. Specifically, FIGS. 1 through 10 illustrate a first embodiment of the disclosed inventive concept. FIGS. 11 through 20 illustrate a second embodiment of the disclosed inventive concept. FIGS. 21 through 25 illustrate a third embodiment of the disclosed inventive concept. FIGS. 26 through 32 illustrate a fourth embodiment of the disclosed inventive concept. And FIGS. 33 through 40 illustrate a fifth embodiment of the disclosed inventive concept. It is to be understood that each embodiment as illustrated is suggestive and not intended as being limiting, as sizes and overall configurations may be varied without deviating from the scope and spirit of the various embodiments of the disclosed inventive concept.

Referring to the first embodiment of the disclosed inventive concept illustrated in FIGS. 1 through 10, an edge clip, generally illustrated as 10, is shown in perspective view. The edge clip 10 has multiple applications but is generally used to hold a component under tension to the clip, thus providing broad application across multiple industries. The edge clip 10 includes a generally u-shaped clip body 12. The clip body 12 may be composed of any material capable of generating a clamp load to hold a component with enough tension so as to prevent the component from separating from the edge clip 10.

The clip body 12 includes a first or upper leg 14 and a second or lower leg 16. The first leg 14 and the second leg 16 are connected by a curved clip end 18. Formed on the inner side of the first leg 14 is a first deep drawn channel 20 and formed on the inner side of the second leg 16 is a second deep drawn channel 22. The widths of the deep drawn channels 20 and 22 may be other than those shown and are not necessarily the same.

To assure that the component is securely held to the clip body 12, at least one but preferably two barbs are provided. Most preferably a first barb 24 and a second barb 24' are formed on the first leg 14. The barbs 24 and 24' assure that only unidirectional movement of the component into the clip body 12 is possible. The barbs 24 and 24' may have a variety of shapes, including but not limited to flat, sharp, round, and spiked.

The first leg 14 includes an upturned end 26 at its end opposite the curved clip end 18. The upturned end 26 allows for easy insertion of the component into the clip body 12. A first window 28 is formed in the deep drawn channel 20 of the first leg 14. The first window 28 is relatively close to the upturned end 26 of the first leg 14. An elongated second window 29 is also formed in the deep drawn channel 20 of the first leg 14. The second window 29 extends into the curved clip end 18.

A movable trigger 30 is provided within the clip body 12. The movable trigger 30 includes a first or upper trigger leg 31 having a clip body engagement flange 32 extending therefrom. The movable trigger 30 also includes a second or lower leg 34 attached to the first leg 31 by a curved trigger end 36. The first leg 31 of the clip body 12 is slidably positioned in the deep drawn channel 20 of the first leg 14 of the clip body 12. The second leg 34 of the clip body 12 is slidably positioned in the deep drawn channel 22 of the second leg 16. The window 29 formed in the clip body 12 is sufficiently large so that the trigger 30 may pass therethrough upon insertion of the component as discussed below.

The clip body 12 is provided to the end user in its pre-attachment state as illustrated in FIGS. 1 through 6. In this state, the movable trigger 30 is positioned toward the open end of the clip body 12. In this position, the flange 32 of the trigger 30 engages the first window 28. This engagement prevents the trigger 30 from prematurely being moved out of position. As illustrated in FIGS. 1 through 4, the pre-attachment position of the trigger 30 maintains a widely spaced relationship between the ends of the first leg 14 and the second leg 16, thereby allowing insertion of the component therebetween.

Upon initial insertion of a component 38 into the clip body 12 as illustrated in FIGS. 3 through 6, the leading edge of the component 38 is placed into contact with the inside of the curved clip end 18. As the component 38 is pushed clip-inward by the operator into the clip body 12, the leading edge of the component 38 forces the flange 32 of the trigger 30 to become disengaged from the window 28.

Clip-inward movement of the component 38 continues until the flange 32 of the trigger 30 is moved into and past the second window 29, thereby being ejected out of the clip body 12. With the component 38 inserted into the clip body 12 to its maximum position, the maximum tension applied to the component 38 by the barbs 24 and 24' prevents release of the component 38 from the clip body 12.

Referring to the second embodiment of the disclosed inventive concept illustrated in FIGS. 11 through 20, an edge clip, generally illustrated as 50, is shown in perspective view. Like the edge clip 10 referenced above, the edge clip 50 has multiple applications but is generally used to hold a component under tension to the clip, thus providing broad application across multiple industries. The edge clip 50 includes a generally u-shaped clip body 52. The clip body 52 also may be composed of any material capable of generating a clamp load to hold a component with enough tension so as to prevent the component from separating from the edge clip 50.

The clip body 52 includes a first or upper leg 54 and a second or lower leg 56. The first leg 54 and the second leg 56 are connected by a solid curved clip end 58. Formed on the inner side of the first leg 54 is a first deep drawn channel 60 and formed on the inner side of the second leg 56 is a second deep drawn channel 62. The widths of the deep drawn channels 60 and 62 may be other than those shown and are not necessarily the same.

To assure that the component is securely held to the clip body 52, at least one but preferably two barbs are provided. Most preferably a first barb 64 and a second barb 64' are formed on the first leg 54. The barbs 64 and 64' assure that only unidirectional movement of the component into the clip body 52 is possible. The barbs 64 and 64' may have a variety of shapes, including but not limited to flat, sharp, round, and spiked.

The first leg 64 includes an upturned end 66 at its end opposite the curved clip end 58. The upturned end 66 allows for easy insertion of the component into the clip body 52. A first window 68 is formed in the deep drawn channel 60 of the first leg 54. The first window 68 is relatively close to the upturned end 66 of the first leg 54. A second window 70 is also formed in the deep drawn channel 60 of the first leg 54, although the second window 70 is relatively close to the curved clip end 58.

A movable trigger 72 is provided within the clip body 52. The movable trigger 72 includes first or upper trigger leg 74 having a clip body engagement flange 76 extending therefrom. The movable trigger 72 also includes a second or lower leg 78 that is attached to the first leg 74 by a curved trigger end 80. The first leg 54 of the clip body 52 is slidably positioned in the deep drawn channel 60 of the first leg 54 of the clip body 52. The second leg 78 of the clip body 52 is slidably positioned in the deep drawn channel 62 of the second leg 56.

The clip body 52 is provided to the end user in its pre-attachment state as illustrated in FIGS. 11 through 15. In this state, the movable trigger 72 is positioned toward the open end of the clip body 52. In this position, the flange 76 of the trigger 72 engages the first window 68. This engagement prevents the trigger 72 from prematurely being moved out of position. As illustrated in FIGS. 11 through 14, the pre-attachment position of the trigger 72 maintains a widely spaced relationship between the ends of the first leg 54 and the second leg 56, thereby allowing insertion of the component therebetween.

Upon initial insertion of the component 38 into the clip body 52 as illustrated in FIGS. 13 through 16, the leading edge of the component 38 is placed into contact with the inside of the curved clip end 58. As the component 38 is pushed clip-inward by the operator into the clip body 52, the leading edge of the component 38 forces the flange 76 of the trigger 72 to become disengaged from the first window 68. Clip-inward movement of the component 38 continues until the flange 76 of the trigger 72 is moved into engagement with the second window 70, as illustrated in FIGS. 17 through 20. With the component 38 inserted into the clip body 52 to its maximum position, the maximum tension applied to the component 38 by the barbs 64 and 64' prevents release of the component 38 from the clip body 52.

Referring to the third embodiment of the disclosed inventive concept illustrated in FIGS. 21 through 25, an edge clip, generally illustrated as 100, is shown in perspective view. Like the edge clips 10 and 50 referenced above, the edge clip 100 has multiple applications but is generally used to hold a component under tension to the clip, thus providing broad application across multiple industries. The edge clip 100 includes a generally u-shaped clip body 102. The clip body 102 also may be composed of any material capable of generating a clamp load to hold a component with enough tension so as to prevent the component from separating from the edge clip 100.

The clip body 102 includes a first or upper leg 104 and a second or lower leg 106. The first leg 104 and the second leg 106 are connected by a solid curved clip end 108. Formed on the inner side of the second leg 106 is a deep drawn channel 110. The width of the deep drawn channel 110 may be other than that shown.

To assure that the component is securely held to the clip body 102, at least one but preferably two barbs are provided. Most preferably a first barb 112 and a second barb 112' are formed on the first leg 104. The barbs 112 and 112' assure that only unidirectional movement of the component into the clip body 102 is possible. The barbs 112 and 112' may have a variety of shapes, including but not limited to flat, sharp, round, and spiked.

The first leg 104 includes an upturned end 114 at its end opposite the curved clip end 108. The upturned end 114 allows for easy insertion of the component into the clip body 102. A first window 116 is formed in the first leg 104. The first window 116 is relatively close to the upturned end 114 of the first leg 104. A second window 118 is also formed in the first leg 104. The second window 118 is relatively close to the curved clip end 108.

A movable trigger 120 is provided within the clip body 102. The movable trigger 120 includes first or upper trigger leg 122 having a clip body engagement flange 124 extending therefrom. The movable trigger 120 also includes a second or lower leg 126 that is attached to the first leg 122 by a curved trigger end 128. The second leg 126 of the trigger 120 is slidably positioned in the deep drawn channel 110 of the second leg 106.

Figure 21:
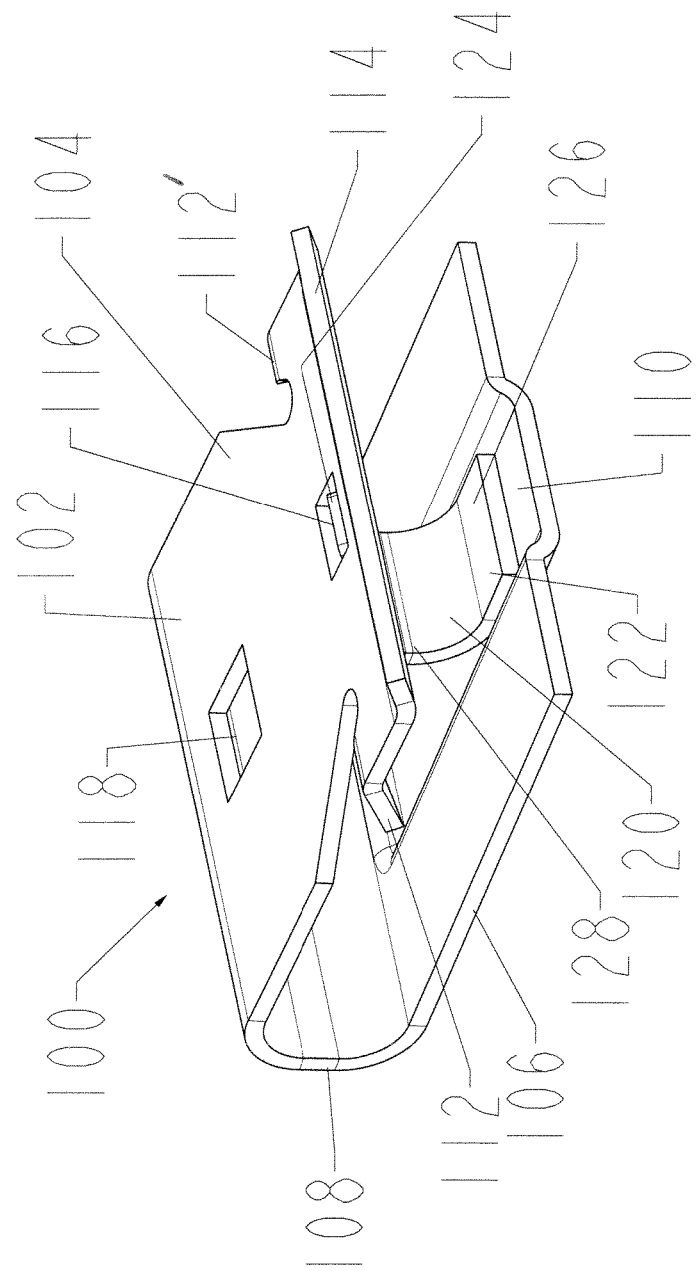
FIG. 21 is a perspective view of an edge clip according to a third embodiment of the disclosed inventive concept shown in its initial position.

The clip body 102 is provided to the end user in its pre-attachment state as illustrated in FIGS. 21 through 23. In this state, the movable trigger 120 is positioned toward the open end of the clip body 102. In this position, the flange 124 of the trigger 120 engages the first window 116. This engagement prevents the trigger 120 from prematurely being moved out of position. As also illustrated in FIGS. 21 through 23, the pre-attachment position of the trigger 120 maintains a widely spaced relationship between the ends of the first leg 104 and the second leg 106, thereby allowing insertion of the component therebetween.

Figure 24:
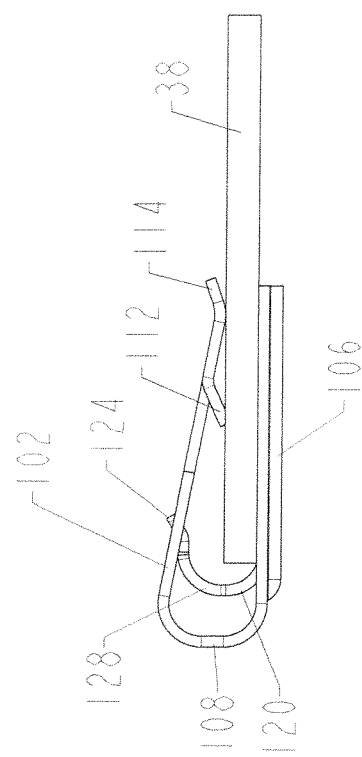
FIG. 24 is a side view of the edge clip according to the third embodiment of the disclosed invention in its final position with the trigger has been fully inserted and the component is in its captured position.
Figure 25:
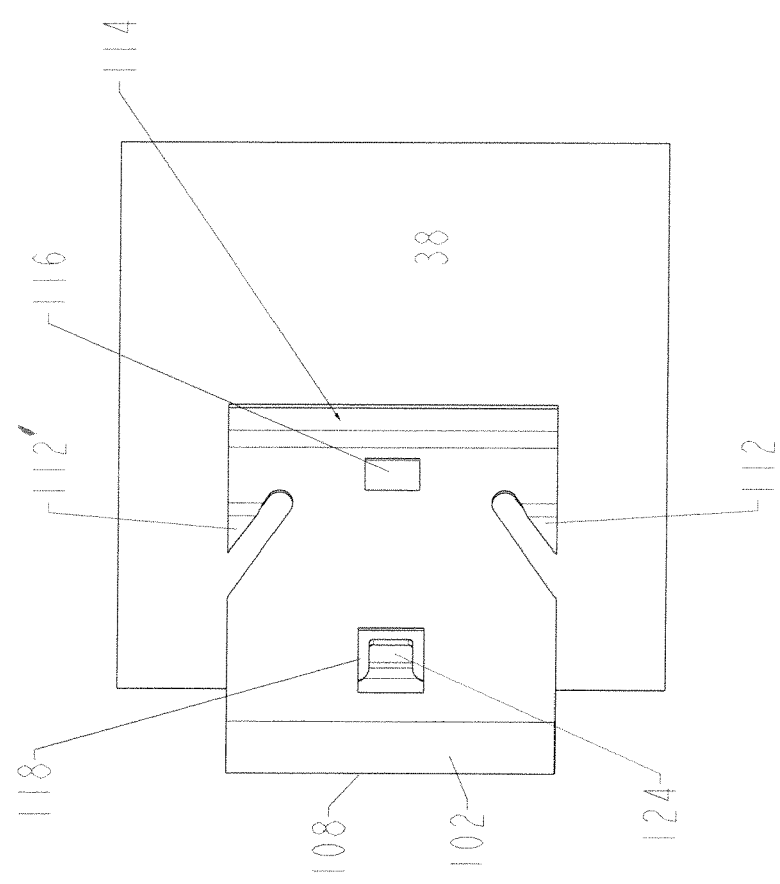
FIG. 25 is a top plan view of the edge clip according to the third embodiment of the disclosed inventive concept in its final position with the component fully inserted.

Upon initial insertion of the component 38 into the clip body 102 as illustrated in FIGS. 22 and 23, the leading edge of the component 38 is placed into contact with the inside of the curved clip end 108. As the component 38 is pushed clip-inward by the operator into the clip body 102, the leading edge of the component 38 forces the flange 124 of the trigger 120 to become disengaged from the first window 116. Clip-inward movement of the component 38 continues until the flange 124 of the trigger 120 is moved into engagement with the second window 118, as illustrated in FIGS. 24 and 25. With the component 38 inserted into the clip body 102 to its maximum position, the maximum tension applied to the component 38 by the barbs 112 and 112' prevents release of the component 38 from the clip body 102.

Referring to the fourth embodiment of the disclosed inventive concept illustrated in FIGS. 26 through 32, an edge clip, generally illustrated as 150, is shown in perspective view. Like the edge clips 10, 50 and 100 referenced above, the edge clip 150 has multiple applications but is generally used to hold a component under tension to the clip, thus providing broad application across multiple industries. The edge clip 150 includes a generally u-shaped clip body 152. The clip body 152 also may be composed of any material capable of generating a clamp load to hold a component with enough tension so as to prevent the component from separating from the edge clip 150.

The clip body 152 includes a first or upper leg 154 and a second or lower leg 156. The first leg 154 and the second leg 156 are connected by a solid curved clip end 158. Formed on the inner side of the first leg 154 is a first deep drawn channel 160 and formed on the inner side of the second leg 156 is a second deep drawn channel 162. The widths of the deep drawn channels 160 and 162 may be other than those shown and are not necessarily the same.

To assure that the component is securely held to the clip body 152, at least one but preferably two barbs are provided. Most preferably a first barb 164 and a second barb 164' are formed on the first leg 154. The barbs 164 and 164' assure that only unidirectional movement of the component into the clip body 152 is possible. The barbs 164 and 164' may have a variety of shapes, including but not limited to flat, sharp, round, and spiked.

The first leg 154 includes an upturned end 166 at its end opposite the curved clip end 158. The upturned end 166 allows for easy insertion of the component into the clip body 152. A first window 168 is formed in the deep drawn channel 160 of the first leg 154. The first window 168 is relatively close to the upturned end 166 of the first leg 154. A second window 170 is also formed in the deep drawn channel 160 of the first leg 154, although the second window 170 is relatively close to the curved clip end 158.

A movable trigger 172 is provided within the clip body 152. The movable trigger 172 includes first or upper trigger leg 174 having a clip body engagement flange 176 extending therefrom. The movable trigger 172 also includes a second or lower leg 178 that is attached to the first leg 174 by a curved trigger end 180. A frangible attachment bridge 182 preliminarily attaches the trigger 172 to the second leg 156 of the clip body 152.

The clip body 152 is provided to the end user in its pre-assembled state as illustrated in FIGS. 26 and 27. In this state, the movable trigger 172 is suspended from the second leg 156 of the clip body 152 by the frangible attachment bridge 182. The user then removes the movable trigger 172 from the second leg 156 by breaking the frangible attachment bridge 182 in any of several known ways, including, but not limited to, back-and-forth movement of the trigger 172 relative to the clip body 152 until the frangible attachment bridge 182 is weakened to the point of breakage.

Once separated from the clip body 152, the movable trigger 172 is inserted into the clip body in such a way that the first leg 154 of the clip body 152 is slidably positioned in the deep drawn channel 160 of the first leg 154 while the second leg 178 is slidably positioned in the deep drawn channel 162 of the second leg 156. The trigger 172 is inserted clip body-inward curved trigger end 180 first by the operator into the clip body 152 until the flange 176 engages the first window 168 of the first leg 154. The proper, pre-attachment positioning of the trigger 172 within the clip body 152 is illustrated in FIG. 28. In addition, and referring also to FIGS. 29 and 30, the pre-attachment position of the trigger 172 is illustrated, showing how the trigger 172 maintains a widely spaced relationship between the ends of the first leg 154 and the second leg 156. Thus positioned, the assembled clip body 152 is now ready for insertion of the component 38.

Figure 32:
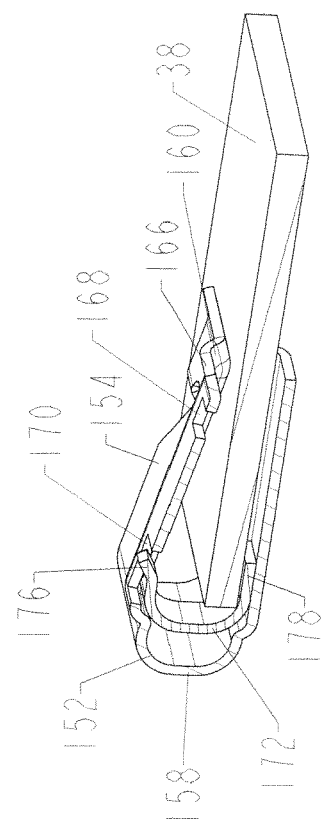
FIG. 32 is the same view as FIG. 31 but shown in cross-section.
Figure 31:
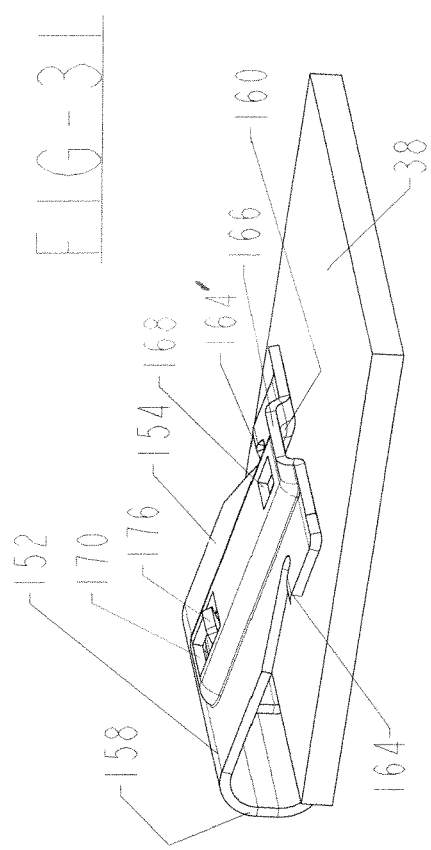
FIG. 31 is the same view as FIG. 29 but showing the component fully inserted and the edge clip in its final position.

Upon initial insertion of the component 38 into the clip body 152 as illustrated in FIGS. 29 and 30, the leading edge of the component 38 is placed into contact with the inside of the curved clip end 158. As the component 38 is pushed clip-inward by the operator into the clip body 152, the leading edge of the component 38 forces the flange 176 of the trigger 172 to become disengaged from the first window 168. Clip-inward movement of the component 38 continues until the flange 176 of the trigger 172 is moved into engagement with the second window 170, as illustrated in FIGS. 31 and 32. With the component 38 inserted into the clip body 152 to its maximum position, the maximum tension applied to the component 38 by the barbs 164 and 164' prevents release of the component 38 from the clip body 152.

Referring to the fifth embodiment of the disclosed inventive concept illustrated in FIGS. 33 through 40, an edge clip, generally illustrated as 200, is shown in perspective view. Like the edge clips 10, 50, 100 and 150 referenced above, the edge clip 200 has multiple applications but is generally used to hold a component under tension to the clip, thus providing broad application across multiple industries. The edge clip 200 includes a generally u-shaped clip body 202. The clip body 202 also may be composed of any material capable of generating a clamp load to hold a component with enough tension so as to prevent the component from separating from the edge clip 200.

The clip body 202 includes a first or upper leg 204 and a second or lower leg 206. The first leg 204 and the second leg 206 are connected by a solid curved clip end 208. To assure that the component is securely held to the clip body 202, at least one but preferably two barbs are provided. Most preferably a first barb 210 and a second barb 210' are formed on the first leg 204. The barbs 210 and 210' assure that only unidirectional movement of the component into the clip body 202 is possible. The barbs 210 and 210' may have a variety of shapes, including but not limited to flat, sharp, round, and spiked.

A first window 212 is formed in the first leg 204. The first window 212 is relatively close to the open end of the first leg 204. A second window 214 is also formed in the first leg 204, although the second window 214 is relatively close to the curved clip end 208.

A movable trigger 216 is provided within the clip body 202. The trigger 216 may be made from a wide variety of materials, although a pliable polymerized material such as nylon is preferred. The movable trigger 216 includes a front wall 218 that faces the open end of the clip body 202. A component-receiving channel 220 is formed in the front wall 218. A clip body engagement flange 222 is integrally formed with the trigger 216. The trigger 216 further includes a back wall 224 that faces the curved clip end 208. The back wall 224 preferably but not absolutely includes a channel 225. The channel 225 provides flexibility to the back wall 224 so as to more readily fit against the inner surface of the curved clip end 208.

The trigger 216 further includes a lower channel 226 having a pair of spaced-apart lateral arms 228 and 228'. The lateral arms 228 and 228' engage the sides of the second leg 206 and allow the trigger 216 to slide linearly along the second leg 206.

Upon initial insertion of the component 38 into the clip body 202 as illustrated in FIGS. 35 through 37, the leading edge of the component 38 is placed into contact with channel 220 formed on the front wall 218 of the trigger 216. As the component 38 is pushed clip-inward by the operator into the clip body 202, the leading edge of the component 38 forces the flange 222 of the trigger 216 to become disengaged from the first window 212. Clip-inward movement of the component 38 continues until the flange 222 of the trigger 216 is moved into engagement with the second window 214, as illustrated in FIGS. 38 through 40. With the component 38 inserted into the clip body 202 to its maximum position, the maximum tension applied to the component 38 by the barbs 210 and 210' prevents release of the component 38 from the clip body 202.

It is to be understood that while the first through fifth embodiments illustrated in the figures and discussed in conjunction therewith show only a single trigger, two or more triggers positioned side-by-side may also be provided for attaching larger components. Other multiple trigger arrangements are possible such that multiple components could be attached to a single edge clip. Accordingly, the illustration of single triggers is not intended as being limiting.

One skilled in the art will readily recognize from such discussion, and from the accompanying drawings and claims that various changes, modifications and variations can be made therein without departing from the true spirit and fair scope of the invention as defined by the following claims.

What is claimed is:

1. A self-locking edge clip for attachment of a component, the clip comprising:
   a u-shaped clip body changeable between a first position in which the component may be freely inserted to a second position in which the component is captured thereby, said clip body including upper and lower legs and a curved end connecting said legs, said legs and said curved end defining a clip interior having an open end, at least one of said legs having a channel formed therein, said legs being in spaced apart positions to define said open end when said clip body is in said first position;
   a u-shaped trigger slidably and linearly movable in said channel between an initial position in which said legs are in said spaced apart positions and a final, component-engaging position, said trigger being disposed entirely within said clip body when in said initial position; and a first interlock formed between said trigger and said clip body, said first interlock holding said trigger in said initial position.

2. The self-locking edge clip according to claim 1, wherein said u-shaped trigger is linearly displaceable from said initial position to said final position upon insertion of the component therein.

3. The self-locking edge clip according to claim 1, further including a second interlock for holding said trigger in said final position, said second interlock being positioned closer to said curved end of said clip body than said open end of said clip body.

4. The self-locking edge clip according to claim 3, wherein said first interlock includes a first window formed in one of said legs and a flange formed on said trigger and said second interlock includes a second window formed in said one of said legs and said flange formed on said trigger.

5. The self-locking edge clip according to claim 4, wherein said first and second windows are formed in said channel.

6. The self-locking edge clip according to claim 1, further including a window formed in said curved end of said clip body for receiving a portion of said trigger when said trigger is in said final position.

7. The self-locking edge clip according to claim 1, wherein said trigger includes a curved end and wherein said curved end of said body includes a channel for substantially receiving said curved end of said trigger when said trigger is in said final position.

8. The self-locking edge clip according to claim 1, wherein said channel formed in one of said legs is a first channel and wherein a second channel is formed in the other of said legs.

9. The self-locking edge clip according to claim 1, further including a frangible bridge attaching said trigger to said clip body.

10. The self-locking edge clip according to claim 1, further including a component-gripping barb formed on one of said legs.

11. A push-on clip fastener for attachment of a component, the fastener comprising:
a u-shaped clip body including an open end and a closed end, said clip body having first and second legs and an end wall connecting said legs, said clip body providing a clamp load for engaging part of the component;
a first window formed in said first leg, said first window being closer to said open end of said clip body than said closed end;
a second window formed in said first leg, said second window being closer to said closed end of said clip body than said open end;
a u-shaped trigger for receiving a portion of the component, said trigger being movable between an initial position and a final position, said trigger being disposed entirely within said clip body when in said initial position, said trigger including a locking flange extending therefrom, said locking flange being engageable with said first window when in said initial position and with said second window when in said final position.

12. The push-on clip fastener of claim 11, wherein said trigger is disposed within said clip body when in said final position.

13. The push-on clip fastener of claim 11, wherein said trigger is u-shaped and includes a first portion, a second portion, and a back portion, said locking flange extending from said first portion.

14. The push-on clip fastener of claim 11, wherein said first leg includes a trigger-guiding channel formed therein.

15. The push-on clip fastener of claim 14, wherein said windows are formed in said trigger-guiding channel.

16. The push-on clip fastener of claim 11, wherein said first and second legs of said clip body include side edges and wherein said trigger includes an underside and spaced-apart lateral arms, said spaced-apart lateral arms being slidable along said side edges of one of said legs.

17. The push-on clip fastener of claim 11, wherein said end wall of said clip body includes a trigger-passing aperture formed therein.

18. The push-on clip fastener of claim 11, wherein said trigger includes a curved end and wherein said end wall of said clip body includes a channel for substantially receiving said curved end of said trigger when said trigger is in said final position.

19. The push-on clip fastener of claim 11, further including a frangible bridge attaching said trigger to said clip body.

20. The push-on clip fastener of claim 11, further including a component-gripping barb formed on one of said legs, said barb having a shape, said shape being selected from the Species consisting of flat, sharp, round, and spiked.

21. A push-on clip fastener for attachment of a component, the fastener comprising:
a clip body having first and second legs and an end wall connecting said legs;
a first window formed in said first leg;
a second window formed in said first leg;
a trigger for receiving a portion of the component, said trigger being movable between first and second positions, said trigger being disposed entirely within said clip body when in said first position, said trigger including a locking flange extending therefrom, said locking flange being engageable with said first window when in said first position and with said second window when in said second position.

22. The push-on clip fastener of claim 21, wherein said trigger is disposed within said clip body when in said second position.

23. The push-on clip fastener of claim 21, wherein said trigger is u-shaped and includes a first portion, a second portion, and a back portion, said locking flange extending from said first portion.

24. The push-on clip fastener of claim 21, wherein said first leg includes a trigger-guiding channel formed therein.

25. The push-on clip fastener of claim 24, wherein said windows are formed in said trigger-guiding channel.

26. The push-on clip fastener of claim 21, wherein said first and second legs of said clip body include side edges and wherein said trigger includes an underside and spaced-apart lateral arms, said spaced-apart lateral arms being slidable along said side edges of one of said legs.

27. The push-on clip fastener of claim 21, wherein said end wall of said clip body includes a trigger-passing aperture formed therein.

28. The push-on clip fastener of claim 21, wherein said trigger includes a curved end and wherein said end wall of said body includes a channel for substantially receiving said curved end of said trigger when said trigger is in said second position.

29. The push-on clip fastener of claim 21, further including a frangible bridge attaching said trigger to said clip body.

30. The push-on clip fastener of claim 21, further including a component-gripping barb formed on one of said legs, said barb having a shape, said shape being selected from the Species consisting of flat, sharp, round, and spiked.

* * * * *